(12) United States Patent
Zhao et al.

(10) Patent No.: US 6,388,755 B1
(45) Date of Patent: May 14, 2002

(54) WIRELESS POSITION AND ORIENTATION DETECTING SYSTEM

(75) Inventors: Ying Zhao; Yong-Sheng Chao, both of Storrs, CT (US)

(73) Assignee: Advanced Optical Technologies, Inc., E. Hartford, CT (US)

( * ) Notice: Subject to any disclaimer, the term of this patent is extended or adjusted under 35 U.S.C. 154(b) by 0 days.

(21) Appl. No.: 09/441,285

(22) Filed: Nov. 16, 1999

Related U.S. Application Data

(63) Continuation-in-part of application No. 09/204,225, filed on Dec. 3, 1998, now abandoned.

(51) Int. Cl.$^7$ .............................................. G01B 11/14
(52) U.S. Cl. ...................................................... 356/614
(58) Field of Search ....................... 356/139.01–139.09, 356/141.1–141.4, 400, 614–624; 250/206.1, 559.31

(56) References Cited

U.S. PATENT DOCUMENTS

| | | | |
|---|---|---|---|
| 4,225,226 A | | 9/1980 | Davidson et al. |
| 4,649,504 A | | 3/1987 | Krouglicof et al. |
| 4,700,301 A | | 10/1987 | Dyke |
| 5,059,789 A | | 10/1991 | Salcudean |
| 5,475,367 A | * | 12/1995 | Prevost |
| 5,784,022 A | * | 7/1998 | Kupfer |
| 5,917,449 A | * | 6/1999 | Sanderford et al. |

* cited by examiner

Primary Examiner—Frank G. Font
Assistant Examiner—Tu T. Nguyen
(74) Attorney, Agent, or Firm—Morse, Altman & Martin

(57) ABSTRACT

An apparatus and method for wirelessly determining position and orientation of a first object relative to a second object in six dimensions, including one or more recording assemblies and one or more identification-coded or orientation-coded optical transponders. The positions of the recording assemblies are fixed relative to the first object and the transponders are fixed relative to the second object. A light source in each recording assembly emits light into space that is received, modulated, and retransmitted back by each transponder to a photodetector assembly in the recording assembly. The identification-coded optical transponder modulates the retransmitted light with a unique fixed code. The orientation-coded optical transponder modulates the retransmitted light with a unique fixed code that depends upon the direction of the incident light. The photodetector assemblies provide one or two independent position parameters for each transponder and two independent orientation parameters for each orientation-coded transponder. The system includes a combination of recording assemblies and transponders that provides at least six independent measured parameters.

15 Claims, 9 Drawing Sheets

WIRELESS POSITION AND ORIENTATION DETECTING SYSTEM

This application is a CIP of Ser. No. 09/204,225 filed Dec. 3, 1998 which is now abandoned.

GOVERNMENT FUNDING

The research involved in this application was funded in part by the Department of Defense, Contract Numbers F04611-97-0040 and F04611-98-0020. The intellectual property rights of the applicant and the government of the United States of America are governed by Title 37 Code of Federal Regulations Part 401.

BACKGROUND OF THE INVENTION

1. Field of the Invention

The present invention relates to remote control and remote target tracking, in particular to wireless direct pointing input devices in human-computer interfaces, or an optical device that directly determines the position and orientation of an object in six dimensions through wireless data acquisition.

2. The Prior Art

An optical direct pointing device is an optical system that has a moveable object called a direct pointer, held by an operator in front of a computer screen. At any instant t, the system provides crossing point coordinate data $CXP(x_{cxp}(t), y_{cxp}(t), z_{cxp}=0)$ in the computer display screen coordinate system $(x,y,z)$. The crossing point CXP is the location on the screen surface intersected by the axis of the direct pointer. To provide the data for the crossing point CXP, the system must conduct measurements to determine a set of six independent geometric parameters of the pointer, including three displacement parameters, $T(x_T, y_T, z_T)$, and three rotation parameters, $(\alpha, \beta, \gamma)$. In accordance with the crossing point coordinate data, the computer displays an indicator, known as a cursor, on the screen at coordinate position $CXP(x(t), y(t), z=0)$ so that at any instant t, the user knows where the direct pointer is pointing.

There are several challenges to providing such a six-dimensional direct pointing system so that the position and orientation of the pointer is viewable in real time. First, the data acquisition and processing must be fast. If the minimum time interval between consecutive data points is less than, for example, approximately 1 millisecond, the user would feel satisfactory control over the pointer. On the other hand, as the interval increases beyond, for example, approximately 20 milliseconds, the user would feel an increasingly large drag and discontinuity that eventually becomes unacceptable.

Computation of the crossing point CXP from the measured raw data must be performed in real time. Six-dimensional computation is essentially different from three-dimensional and other simpler cases in that it involves solving a group of nonlinear simultaneous equations, while simpler cases with fewer dimensions merely use straightforward triangle formulas. Thus, for fewer than five dimensions, there is always a solution that can be obtained relatively easily.

On the other hand, with six dimensions, three linear and three angular dimensions, quite often a great many fictitious solutions are produced, which then must be sorted through to find the correct solution. This would not be a critically important problem if there were no time constraints. But since there is a limit to the amount of time that can be taken to find a solution, a new method for finding the correct solution is needed. None of the relevant prior art systems for position and orientation measurement can provide such a capability. For example, U.S. Pat. No. 4,225,226, issued to Davidson et al., discloses the use of a light source, a number of retroreflectors, and a photodetection system to measure the position of an airplane over a crop field. The system is essentially limited to two dimensions because the airplane is assumed to be maintained in a plane parallel to that of the retroreflectors and the ground. Thus, the techniques disclosed are not applicable to six-dimensional measurements.

Second, the moveable object must be compact, light in weight, and draw little electrical power. It must be no larger than hand-held, and preferably smaller. Many six-dimensional measurement systems of the prior art developed for robot systems and target-tracking systems in industry and weaponry are not applicable to the present case largely because they are not sized to be hand held.

U.S. Pat. No. 5,059,789, issued to Salcudean, discloses the use of three mutually perpendicular light sources mounted on an object to illuminate a large resistive two-dimensional position-sensitive detector sheet to determine the position and orientation of the object in six dimensions. The technique requires a large resistive two-dimensional position-sensitive detector sheet with a dimensions comparable to the distance between the object and the detector, making it rely on an essentially different principle than that of the present invention.

U.S. Pat. No. 4,649,504, issued to Krouglicof et al., discloses the use of three light sources mounted at different fixed locations on a moveable object and a pair of 2D photodetectors to provide position and orientation of the object. The technique looks having some superficial similarity to the techniques of the present invention. However, the techniques need a reasonable amount of separation between the light sources or between the detectors to obtain meaningful data. So if the light sources are too close together on the moveable object, the detection system cannot distinguish between them with enough accuracy to be useful. Thus, the moveable object must be relatively large in order to have enough separation between the three light sources, meaning that the moveable object would be too large to be used as a light-weight handheld device.

Reversing the components, that is, fixing the location of the three light sources and mounting the photodetectors on the moveable object, does not solve the problem because the photodetectors would still need to be a reasonable distance apart.

SUMMARY OF THE INVENTION

The primary objective of the present invention is to provide an optical system for wirelessly determining the position and orientation of an object in six dimensions relative to another object.

The present invention offers an apparatus and method for wirelessly determining position and orientation of an object in six dimensions and at the same time substantially eliminates the problems and disadvantages associated with the relevant devices of the prior art.

A preferred embodiment of the present invention includes a movable orientation-coded optical transponder and two recording assemblies. Each recording assembly comprises a light source, a photodetector assembly, and optionally, a beam splitter. In the preferred embodiment, the light source, photodetector assembly, and beam splitter are installed rigidly together. The transponder is attached to the object whose position and orientation is desired.

In operation, each light source emits source light into the space that the transponder will potentially traverse. The source light is received, optionally modulated, retransmitted back to the photodetector. The light source is preferably a light emitting diode (LED) or semiconductor laser that emits light at an infrared wavelength.

An orientation-coded optical transponder is described in U.S. patent application Ser. No. 09/181,761, entitled INTEGRATED OPTICAL RETROREFLECTING MODULATOR, incorporated herein by reference. The orientation-coded optical transponder modulates the retransmitted light depending upon the direction of the incident light. In other preferred embodiments, identification-coded (ID-coded) transponders can be used or a combination of ID-coded transponders and an orientation-coded transponder can be used. Specific system configurations are described below.

Preferably the photodetector assembly includes a lens assembly and a photodetector. In one embodiment, the lens assembly includes a two-dimensional lens that focuses the retransmitted light onto a focal plane coincident with a two-dimensional photodetector to provide an image from the transponder. In another embodiment, the lens assembly includes two cylindrical lens that focus the retransmitted light onto two perpendicular focal lines coincident with two linear photodetectors to provide an image from the transponder. Both embodiments provide a two-dimensional Cartesian location for the image relative to a reference point on the photodetector assembly. A third embodiment of the photodetector uses a single cylindrical lens and a single linear photodetector. This embodiment is used to determine only a single coordinate of an image.

The transponders and recording assemblies are used in various combinations to determine the position and orientation of one object relative to another. One common aspect of these various combinations is that the moveable object has only one component of the invention, whether it is only one transponder or only one recording assembly. Recall that several prior art designs used two components on the moveable object, meaning that the moveable object has to be relatively large so the components can be spaced apart. Having a single component on the moveable object means that the moveable object can be made small enough to be handheld. The various combinations of the present invention include:

1) One orientation-coded transponder attached to the moveable object, and one two-dimensional recording assembly and one one-dimensional recording assembly at fixed locations;
2) One orientation-coded transponder attached to the moveable object and three one-dimensional recording assemblies at fixed locations;
3) One one-dimensional recording assembly attached to the moveable object and two orientation-coded transponders at fixed locations;
4) One two-dimensional recording assembly attached to the moveable object, and one orientation-coded transponder and one ID-coded transponder at fixed locations; and
5) One two-dimensional recording assembly attached to the moveable object and three ID-coded transponders at fixed locations.

The preferred combinations all provide at least six independent measured parameters from which the position and orientation of one object relative to another in six dimensions can be determined.

The following are examples of applications of the present invention:

1) Measuring and tracking of a pilot's head movements for direct control of aiming of sensor and weapon systems in an aircraft.
2) Measuring and tracking human body movements for control of computer operation and display in virtual reality systems, including surrounding screen room facilities for virtual reality systems.
3) Human wireless control of robots and other remote mechanical devices.
4) A remote control for computer-related television, such as interactive TV or WebTV.
5) An aid in gun-shooting training practices and in a simulated gun-shooting games.
6) Generally, as a wireless direct input device in human-computer interfaces. For example, the orientation-coded optical transponder may be held in a user's hand, used as a direct pointer. The direction of a reference axis of the pointer can be thought of as the direction of the user's finger pointing direction. The corresponding cursor position on the computer display screen can be used for menu selection.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

Note that the above figures are not drawn to scale or to reflect dimension ratios.

DETAILED DESCRIPTION

There are a number of preferred embodiments of the present invention. In each of the below-described embodiments, it is assumed that the system is being used as a cursor device for a computer. This is but one application, and any application that can take advantage of the system of the present invention is contemplated.

In order to provide the position and orientation of an object relative to another object in six dimensions (three position and three orientation), six independent measurable parameters are necessary. All of the below-described embodiments have in common a combination of transponders and recording assemblies that provide at least six independent measured parameters. In addition, they all provide a combination where the moveable object has only one transponder or only one recording assembly.

A. Hardware Embodiments

Figure 1:
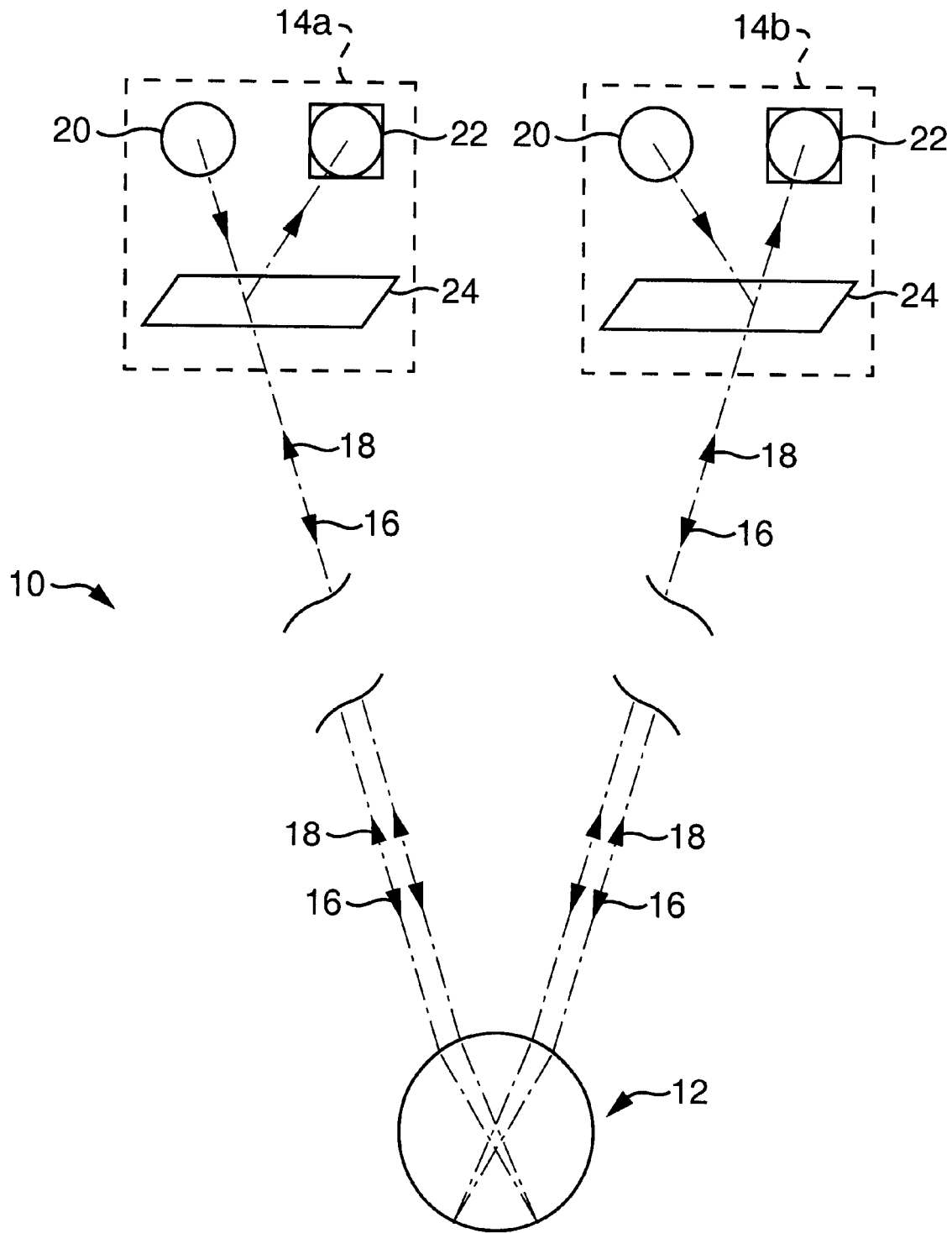
FIG. 1 is a pictorial representation of the first embodiment of the present invention.
Figure 2:
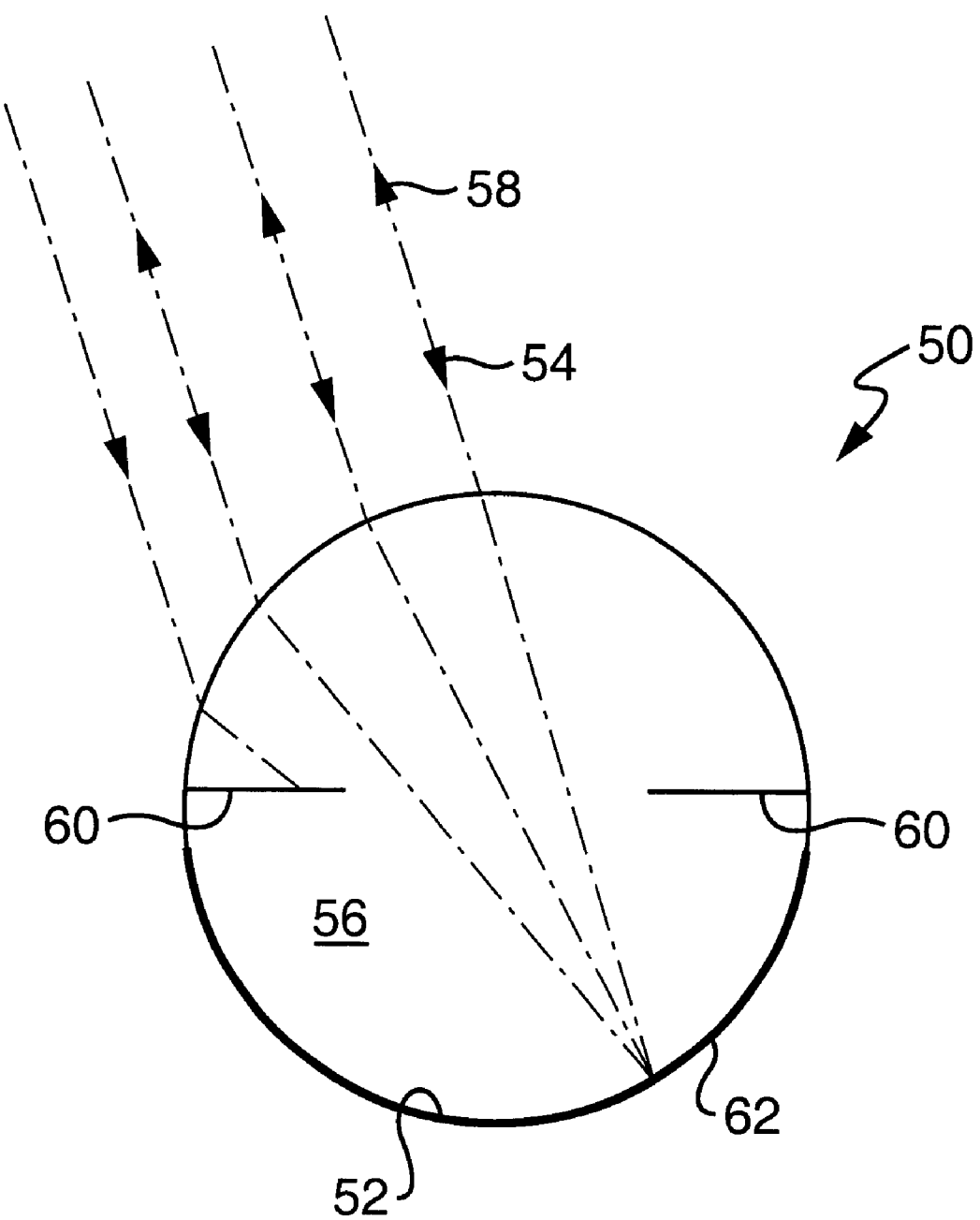
FIG. 2 illustrates a specialty sphere lens retroreflector.

1. The First Preferred Embodiment: One Orientation-Coded Transponder and at Least Two Recording Assemblies The first preferred embodiment of the position and orientation system 10 of the present invention is illustrated in FIG. 1. The system 10 includes one movable optical orientation-coded transponder 12 and at least two recording assemblies 14 (individually, 14a and 14b). Each recording assembly 14 comprises at least one light source 20, one photodetector assembly 22, and optionally, one beam splitter 24. In the preferred embodiment, the light source 20, photodetector assembly 22, and beam splitter 24 are installed rigidly together as one recording assembly 14. The recording assemblies 14 are placed separately at fixed positions within the line-of-sight of the transponder 12. The transponder 12 can be an independent movable object, whose position and orientation in six dimensions are to be determined, or it can be used as a tag attached to an object whose six-dimensional data is to be determined. Information is exchanged between the recording assemblies 14a, 14b and the transponder 12 through optical data transmission, so it is remote and wireless.

The recording device light source 20 emits a source light beam into space. The directions that need to be covered by the source light beam depend upon the particular application. The incident light beam 16 is received by the transponder 12 and retransmitted back in the reverse direction as the originating beam, as at 18. In several embodiments, the transponder 12 modulates the beam prior to retransmitting to back.

a. The Light Source 20. In the preferred embodiment, the light source 20 emits source light toward the transponder 12, as at 16. The light source 20 may be of any type of source capable of optical output. Preferably, the light source 20 emits infrared light. One preferred wavelength is in the range of approximately 750 nm to 1000 nm. When the present optical system operates at this wavelength range, ambient interference is substantially reduced, and the cost of optical components is less than those for other wavelength regions. Another preferred infrared wavelength region is between approximately 1.5 $\mu$m and 2.0 $\mu$m, the eye-safe infrared wavelength region. Alternatively, light rays of other wavelengths may be used as desired for particular purposes. However, it is required that the light emitted from the light source 20 be able to illuminate the transponder 12 in sufficient strength to provide a strong enough signal back to the recording assembly 14.

In the preferred embodiment, the light source 20 is either a light emitting diode (LED), a semiconductor laser, or other laser source. When the distance between the transponder 12 and the light source 20 is relatively small, for example, less then 5 meters, the light source 20 can be an LED. When the distance is greater than 5 meters, the light source 20 is preferably a semiconductor laser. The light source 20 may be modified and adapted so that it is able to emit its energy most efficiently in the direction of the transponder 12.

b. The Optical Transponder 12. Two general types of transponders are preferred for use in the present invention, the identification-coded (ID-coded) optical transponder and the orientation-coded optical transponder, preferred embodiments of which are described in U.S. patent application Ser. No. 09/181,761, incorporated herein by reference. Briefly, the ID-coded optical transponder is a retroreflector that modulates the reflected beam with a single code regardless of the direction from which the incident beam originates. The orientation-coded optical transponder is a retroreflector that modulates the reflected beam with a unique code that depends upon the direction from which the incident beam originates relative to the transponder. Use of the orientation-coded optical transponder allows the systems to determine the all six direction and orientation parameters of the transponder relative to a fixed location with high accuracy and high efficiency. The resolution of the system depends upon the resolution of the transponder. The more directions that the transponder can distinguish, the greater resolution of the system. However, since the complexity and cost increase with the resolution, the preferred resolution is between 64×64 and 10,000×10,000.

Other optical transponder structures are also contemplated by the present invention, such as (a) a simple retroreflector; (b) a simple combination of a liquid crystal modulator in front of a retroreflector; (c) a combination of a simple retroreflective modulator and a two-dimensional photodetector array can provide an orientation-coded optical transponder. Although these devices may not perform as well as the preferred embodiment, they still can be used in the present invention.

Note also that the optical transponder can be comprised of a set of discrete components to execute the essentially same function. For example, an ID-coded transponder can be comprised of a simple photodetector and a light source. The light source emits light that is modulated by the information received from the photodetector and by identifier information. An orientation-coded transponder can be comprised of a two-dimensional photodetector and a light source. The light source emits light that is modulated by the direction information received from the photodetector and by identifier information.

c. The Beam Splitter 24. As seen in FIG. 1, the beam splitter 24 shifts the retransmitted light beams 18 slightly away from the light source 20 to avoid the geometric configuration conflict between the light source 20 and the photodetector assembly 22. Alternatively, if approximated measurements are adequate, the beam splitter 24 may be omitted. When the distance between the recording assembly 14 and the transponder 12 is much larger than the distance between the light source 20 and the photodetector assembly 22, the measurements can be carried out without the beam splitter 24.

d. The Photodetector Assembly 22. In the preferred embodiment, the photodetector assembly 22 includes a lens assembly 70 and a photodetector 72. Optionally, an optical filter is used to reduce interference from background light, as is standard practice in any optical system. The lens assembly 70 includes at least one lens having a focal plane 74 for focusing the reflected light beams 18. As a result, there is one focal point 80 on the focal plane 74 of the lens assembly 70, each providing an image from one transponder 12. If more than one transponder 12 is used, more focal points will be present. The photodetector 72 is located at the focal plane 74 of the lens assembly 70 and records the image coordinates ($\xi,\eta$) at the focal point 80.

Figure 3:
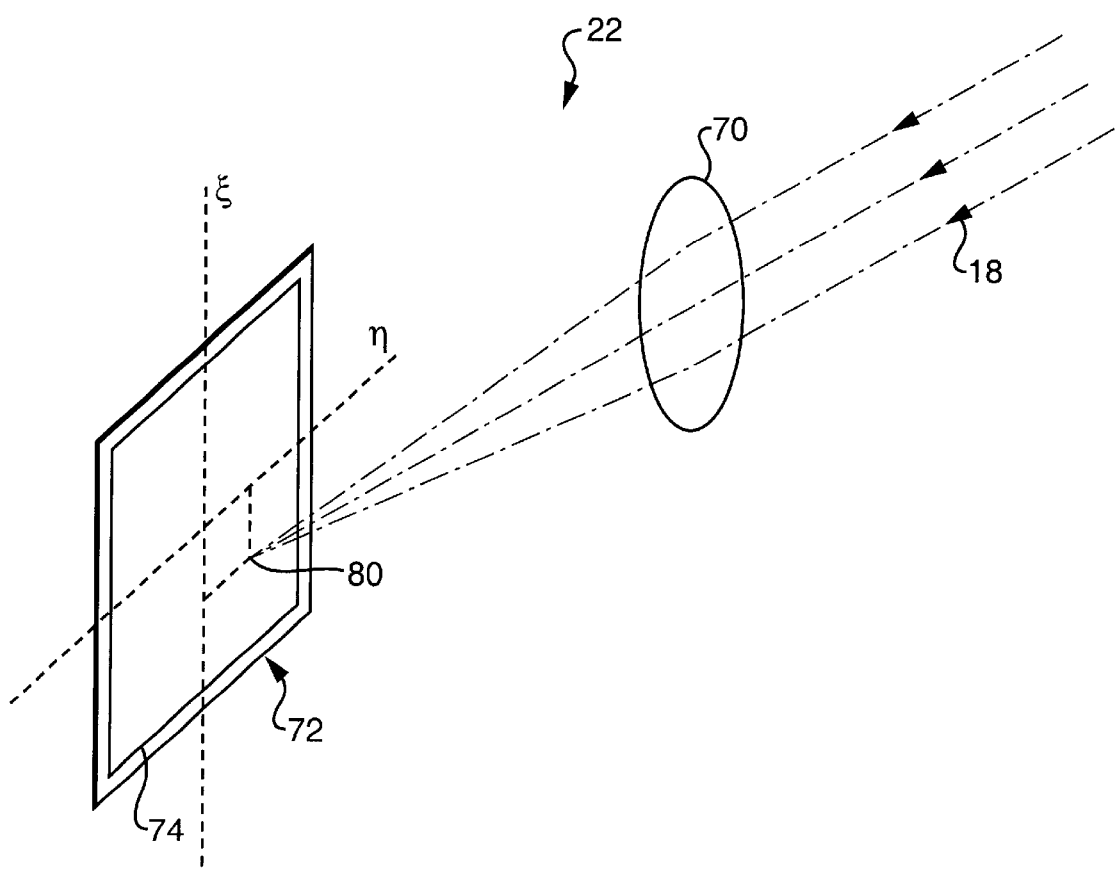
FIG. 3 illustrates the photodetector assembly as a single two-dimensional photodetector.

In the embodiment of FIG. 3, the lens assembly 70 has a two-dimensional focal plane 74. In such a case, a two-dimensional image sensor such as a CCD sensor or a CMOS image sensor, may be used as the photo-detector 72. When a two-dimensional image sensor is used, one set of coordinate data ($\xi,\eta$), corresponding to the transponder 12, is directly read out as the position coordinate. When each focal point is not exactly sharp, but has a small distributed area due to engineering imperfection, a center point can always be determined as the focal point.

Figure 4:
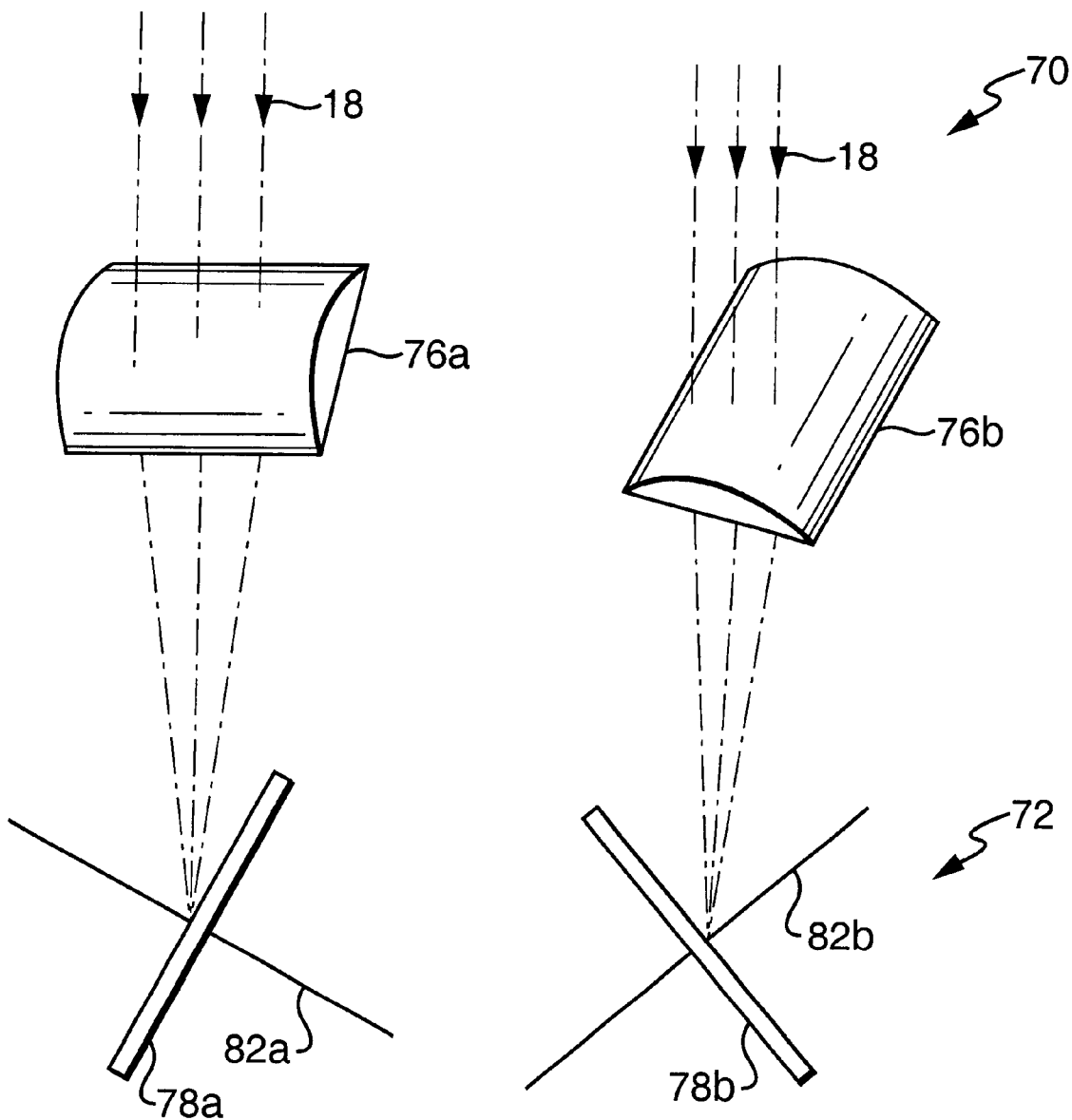
FIG. 4 illustrates the photodetector assembly as a pair of cylindrical lenses and perpendicular linear photodetector arrays.
Figure 5:
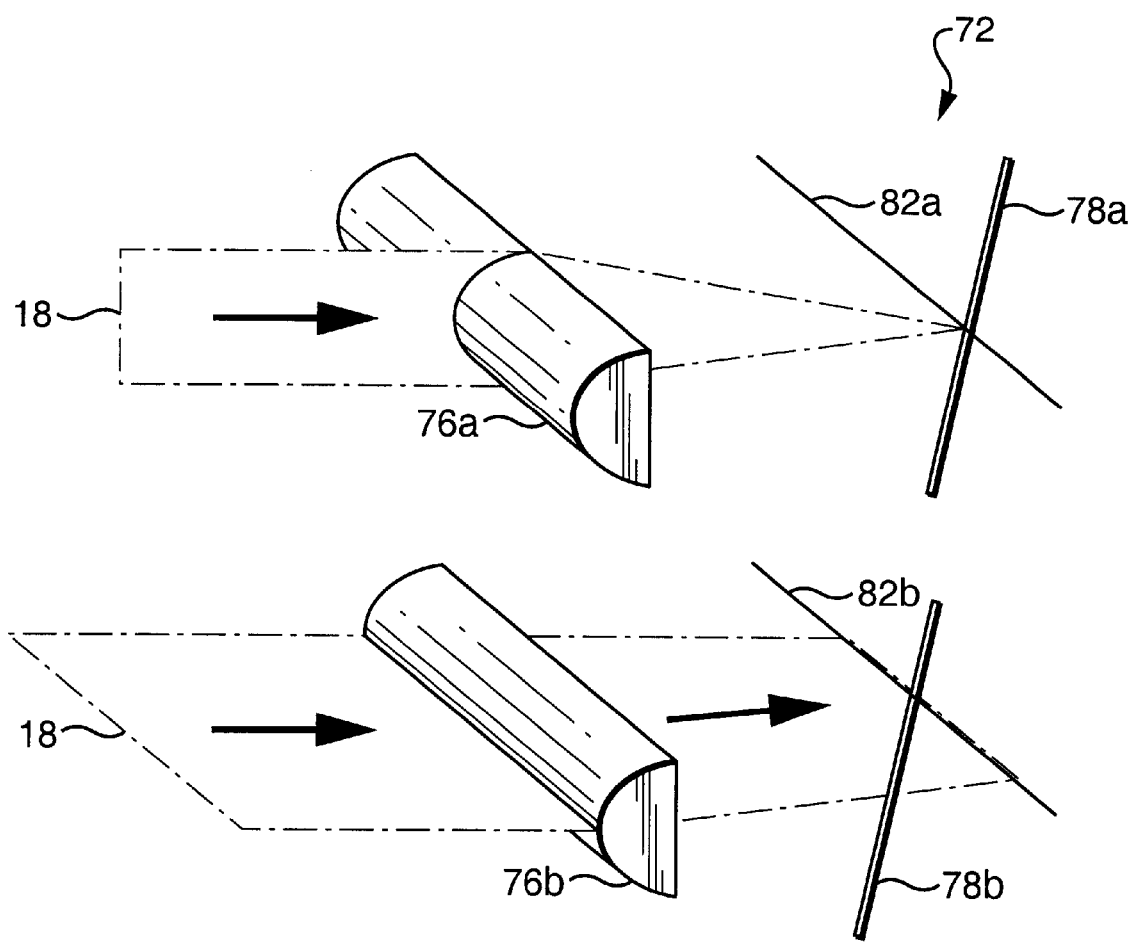
FIG. 5 illustrates the cylindrical lenses focusing light to a point on the linear photodetector arrays of FIG. 4.

In the embodiment of FIGS. 4 and 5, the lens assembly 70 is a pair of cylindrical lens 76a, 76b, and the photodetector 72 is a corresponding pair of linear photodetector arrays 78a, 78b. The linear photodetector arrays used in the preferred embodiment are chosen for their relatively high data transfer speed and lower cost. The cylindrical lens 76 focuses a collimated broad light beam 18 retransmitted from each of the transponders 12 into a focal line 82, as in FIG. 5. In the preferred embodiment, the cylindrical lenses 76a, 76b are placed perpendicular to each other, so that two line images are formed. Thus, one linear photodetector array 78a is placed along the $\xi$ axis and the other linear photodetector array 78b is placed along the $\eta$ axis. The linear detector array 78a always has a crossing point with the focal line 82a; the linear detector array 78b always has a crossing point with the focal line 82b. Thus, for each light beam 18, a coordinate data pair ($\xi,\eta$) is recorded by the photodetector assembly 22, corresponding to the transponder 12.

Alternatively, instead of using the cylindrical lens pair 76a, 76b, the lens system assembly 70 may be a single lens that is designed specially to have two focal line images formed perpendicular to each other, one crossing $\xi$ axis, the other crossing $\eta$ axis. Any other methods that combining the two cylindrical lenses into one lens system by using current geometry optics knowledge are also contemplated by the present invention.

Once the retransmitted light beam 18 is recorded on the photodetector assembly 22, the orientation and the position of the transponder 12 or the position of the object having the transponder 12 installed in a fixed position can be determined.

e. Calculation of position and orientation of the transponder. This embodiment uses one orientation-coded transponder T attached to a moveable object and two fixed recording assemblies. In order to show the calculations for different detector arrays, it is assumed that one recording assembly (subscript "B") uses a two-dimensional detector array or a pair of linear detector arrays, and that the other recording assembly (subscript "A") uses a single linear detector array.

A reference coordinate system XYZ is fixed with respect to the recording assemblies. The unknown location of the transponder in the XYZ system is denoted as $T(X_T,Y_T,Z_T)$. All of the location data for the recording assemblies are either directly or indirectly known in the XYZ system. In particular, the coordinates of the lens centers, $O_A(x_{OA},y_{OA},z_{OA})$ and $O_B(x_{OB},y_{OB},z_{OB})$, are known. For the two-dimensional detector array B, the coordinates of the recorded image spot $G_b(x_{Gb},y_{Gb},z_{Gb})$ are known. For the one-dimensional recording assembly A, in the coordinate system ($\xi',\eta'$), the recorded image spot is $G_A(\xi_A',\eta')$, with $\eta'$ as an unknown value. Assuming that the $\eta'$ axis is parallel to the Z axis in XYZ system, in $G_A(x_{GA},y_{GA},z)$, z is unknown.

The transponder has an internal coordinate system UVW. In system XYZ, the transponder has six unknown parameters: three displacement coordinates $(x_T,y_T,z_T)$ representing displacements from axes X, Y, and Z, respectively, and three rotation angles $(\alpha,\beta,\gamma)$ representing rotations at the point $(x_T,y_T,z_T)$ around the directions parallel to axes X, Y, and Z, respectively. The task is to determine the six unknown parameters $(x_T,y_T,z_T)$ and $(\alpha,\beta,\gamma)$ from the known image spot locations $G_B(x_{GB},y_{GB},z_{GB})$ and $G_A(x_{GA},y_{GA},z)$ and the measured angles of the transponder from the recording assemblies.

The parameters $(x_T,y_T,z_T)$ are determined by first projecting a straight line $TO_BG_B$ connecting the following three points: the transponder center T, the lens center $O_B$, and the recorded image spot $G_B$. According to lens theory, these three points must be on the same straight line because the image spot $G_B$ is produced by the light spot on the focal point of the specialty sphere lens. The central light ray starts from the specialty sphere lens focal point, passes through the center of the specialty sphere lens T, through the center of the photodetector assembly lens $O_B$, and to the image spot $G_B$. The equation for the line $TO_B$ is written as $$TO_B = t_B \cdot O_B G_B \tag{1-1}$$

where $TO_B$ and $O_B G_B$ are vectors and $t_B$ is a scalar constant characterizing the length of the vector, which is unknown.

Next, project a similar straight line $TO_A G_A$, which has the equation $$TO_A = t_A \cdot O_A G_A \tag{1-2}$$

Finally, in the vector equation system of (1-1) and (1-2), there are a total of six equations. There are three unknown values. $(x_T,y_T,z_T)$ representing the position of the transponder, two unknown values $t_A$ and $t_B$ representing the vector lengths, and one unknown value z. So there are six unknown values in the six independent equations. Thus, the displacement vector $T(x_T,y_T,z_T)$ can be determined through solving the equation system (1-1) and (1-2).

Figure 6:
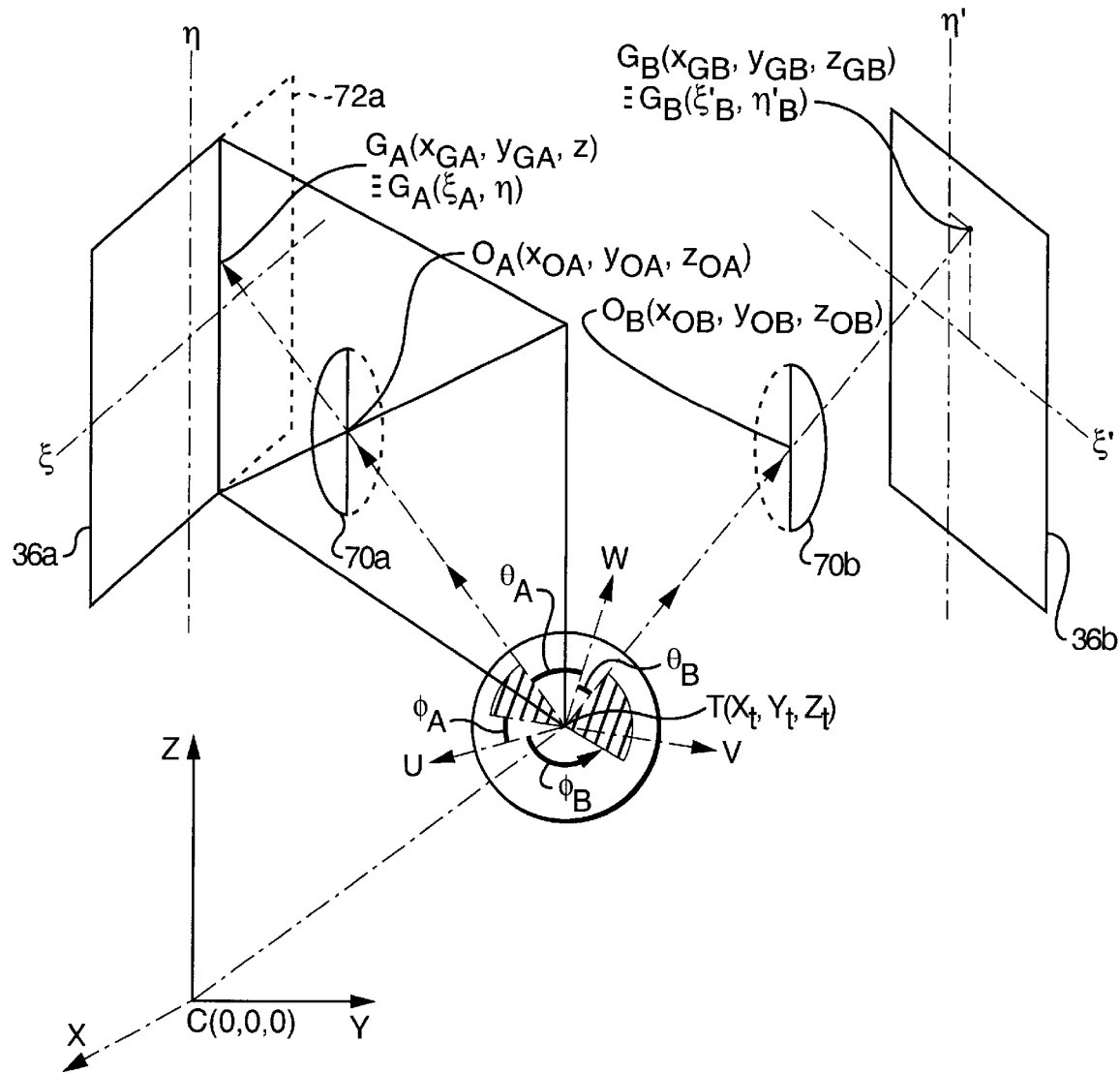
FIG. 6 illustrates the notation for calculation of position and orientation data for the embodiment of FIG. 1.

The parameters $(\alpha,\beta,\gamma)$ are determined by first noting that, in the transponder system UVW, the center of the sphere lens T is located at the system origin $T(x_T,y_T,z_T)$, the plane of the liquid crystal modulator is parallel to the UV plane, and the W axis is coincident with the central axis of symmetry of the transponder. The light beam $TO_B$ is focused at a focal point on the focal surface of the specialty sphere lens. The focal point has a coordinate on the light modulator plane $N_{UB}=N_0 \sin\theta_B \cos\phi_B$ and $N_{VB}=N_0 \sin\theta_B \sin\phi_B$. The angles $\theta_B$ and $\phi_B$ are shown in FIG. 6, and $N_0$ is a known constant representing the number of light modulator pixels along the U and V axes. $N_{UB}$ and $N_{VB}$ are directly determined by (1) demodulating the retransmitted light to read the fixed code with which the light was modulated and (2) determining, typically from a table, what direction of incidence causes the transponder to impress that particular code. Thus, for the $TO_B$ light beam, the equations are $$N_{UB}=N_0 \sin\theta_B \cos\phi_B \tag{1-3}$$

$$N_{VB}=N_0 \sin\theta_B \sin\phi_B \tag{1-4}$$

and for the $TO_A$ light beam, the equations are $$N_{UA}=N_0 \sin\theta_A \cos\phi_A \tag{1-5}$$

$$N_{VA}=N_0 \sin\theta_A \sin\phi_A \tag{1-6}$$

Note that $\sin\theta_B \cos\phi_B$ and $\sin\theta_B \sin\phi_B$ represent the angular relationships between vector $TO_B$ (expressed in XYZ system) and the unit axis vectors u,v,w (in the internal coordinate system UVW). For the calculation in system XYZ, they must be first written as a function of u, v, and w, and then transformed into XYZ system through the well-known matrix relationships $$\sin\theta_B \cos\phi_B = [(TO_B/|TO_B|) - ((TO_B/|TO_B|)\cdot w)w]\cdot u \tag{1-7}$$

$$\sin\theta_B \sin\phi_B = [(TO_B/|TO_B|) - ((TO_B/|TO_B|)\cdot w)w]\cdot v \tag{1-8}$$

where $(TO_B/|TO_B|)$ is the unit vector of $TO_B$, $|ITO_B|$ is the vector length, the dot product $((TO_B/|TO_B|)\cdot w)$ is the projection of $(TO_B/|TO_B|)$ on W axis corresponding to a term of $\cos\theta_B$ the dot product $(TO_B/|TO_B|)-((TO_B/|TO_B|)\cdot w)w$ is the projection of $TO_B/|TO_B|$ on the UV plane, corresponding to the term $\sin\theta_B$ in (1-3) and (1-4), and $[(TO_B/|TO_B|)-((TO_B/|TO_B|)\cdot w)w]\cdot u$ is the further projection of $TO_B/|TO_B|$ on the U axis, corresponding to the entire term ($\sin\theta_B \cos\phi_B$) in (1-3) and (1-4). Similar equations exist for $\sin\theta_A \cos\phi_A$ and $\sin\theta_A \sin\phi_A$.

The u, v, and w unit axis vectors can be expressed in the XYZ system by using the standard coordinate system transform formulas, i.e., $$\begin{vmatrix} u_X \\ u_Y \\ u_Z \end{vmatrix} = |R(\alpha,\beta,\gamma)| \cdot \begin{vmatrix} 1 \\ 0 \\ 0 \end{vmatrix} \quad (1\text{-}9)$$

$$\begin{vmatrix} v_X \\ v_Y \\ v_Z \end{vmatrix} = |R(\alpha,\beta,\gamma)| \cdot \begin{vmatrix} 0 \\ 1 \\ 0 \end{vmatrix} \quad (1\text{-}10)$$

$$\begin{vmatrix} w_X \\ w_Y \\ w_Z \end{vmatrix} = |R(\alpha,\beta,\gamma)| \cdot \begin{vmatrix} 0 \\ 0 \\ 1 \end{vmatrix} \quad (1\text{-}11)$$

In equation system (1-9), $u_x$, $u_y$, and $u_z$ denote the projections of the coordinate unit vector of the coordinate system UVW on X, Y, and Z respectively. v and w are used similarly in equation systems (1-10) and (1-11). $R(\alpha,\beta,\gamma)$ denotes a 3×3 matrix characterizing the rotation of the coordinate system UVW around XYZ and the point T. The multiplication of a matrix to a vector is performed according to standard matrix operations. In equation system (1-3) through (1-6), there are only three independent values from the four equations. Any three of the four equations can be used to uniquely determine the three unknown rotation parameters $(\alpha,\beta,\gamma)$. In this case, there is more data than necessary for the position measurement. The additional data in the orientation equation (1-3) through (1-6), herein defined as abundance data, can be used to provide a consistency check.

When the single linear detector array of recording assembly A is replaced by a two-dimensional detector array, as in recording assembly B, the same measurement results can be obtained. In this case, there is even more data than necessary for the position measurement. The additional data in the position equations (1-1) and (1-2), and in the orientation equation (1-3) through (1-6) can be used to provide a consistency check.

When recording assembly A has only one linear detector array, the recording assembly B has two independent linear detector arrays, and the transponder is a orientation-coded transponder, the accounting of measured independent parameters is as follows: for each transponder, recording assembly A records one independent position parameter and two orientation modulation parameters, and recording assembly B records two independent position parameters and two orientation modulation parameters. The total number of measured independent position parameters is 1+2=3. The total number of measured orientation modulation parameters is 2+2=4. Thus, in the first embodiment, the total number of measured independent parameters is 3+4=7.

2. The Second Preferred Embodiment: One Orientation-Coded Transponder and at Least Three Recording Assemblies In the second embodiment, there are two recording assemblies, A and B, and each recording assembly has a single linear detector array and a light source. Each linear detector array records an independent position parameter. Although the two measured position parameters $\xi_A$ and $\xi_B$ from the two linear detector arrays are insufficient for determining the displacement vector T, which has three unknown parameters $(x_T,y_T,z_T)$, by joining the entire equation system (1-1), (1-2), (1-3), (1-4), (1-5), and (1-6) together, the total number of measured independent parameters will exactly equal the total number of unknown parameters. In this case, the measured independent parameters are $\xi_A$, $\xi_B$, $N_{UB}$, $N_{VB}$, $N_{UA}$, and $N_{VA}$. The total number of the measured independent parameters is six. The number of the unknown displacement parameters T $(x_T,y_T,z_T)$ and rotation angles $(\alpha,\beta,\gamma)$ is also six. Note that equation system (1-1) through (1-6) contains a total of ten equations because there are four intermediate unknown parameters $t_A$, $t_B$, z, and $z_{GB}$. Thus the problem is solvable.

The accounting of the measured independent parameters of the second embodiment is as follows: the transponder records four independent parameters and the two linear detector arrays record two independent position parameters. Thus, the total number of measured independent parameters is 4+2=6.

Figure 7:
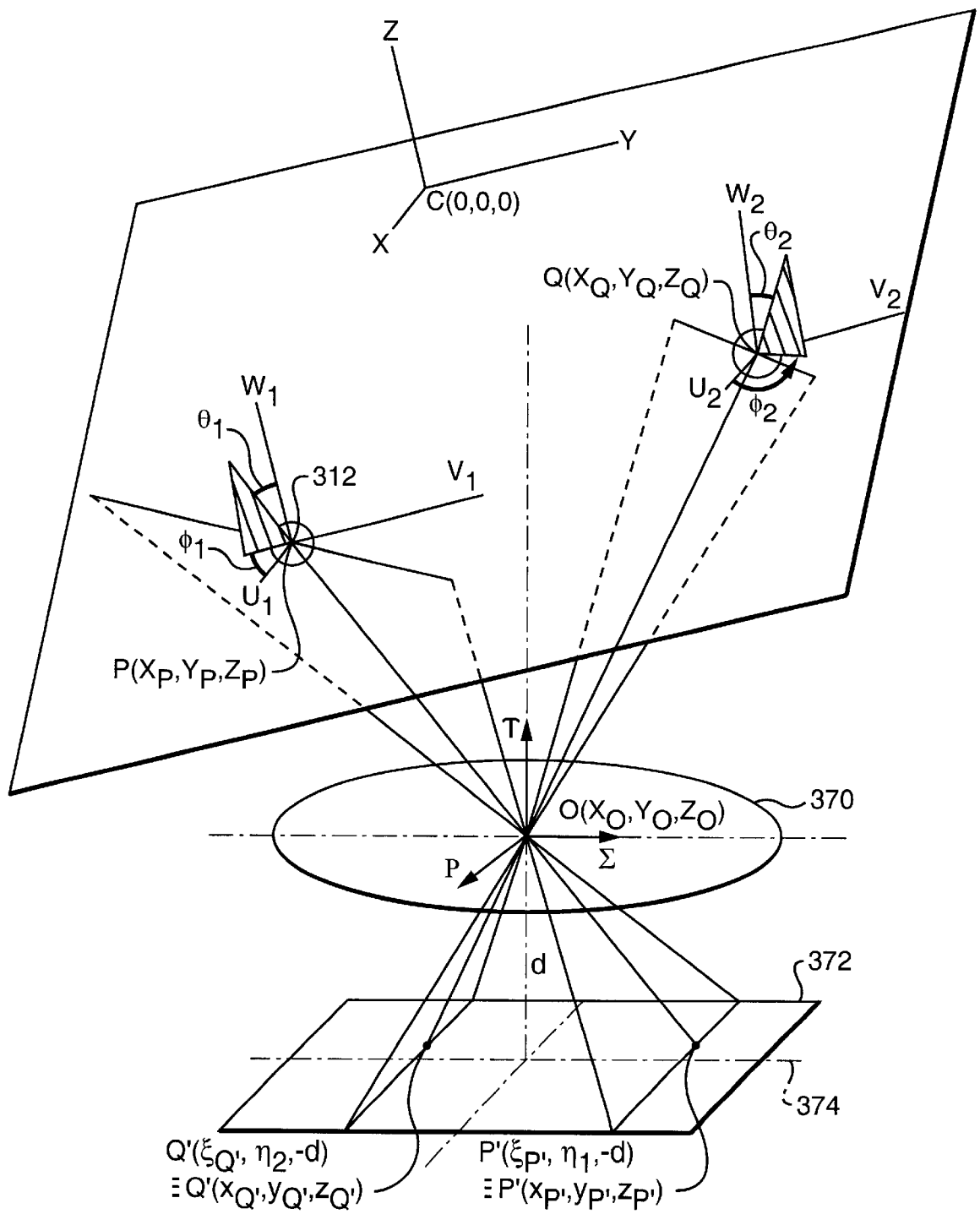
FIG. 7 illustrates the notation for calculation of position and orientation data for the third embodiment.

3. The Third Preferred Embodiment: At Least Two Orientation-Coded Transponders and One Recording Assembly As shown in FIG. 7, the third preferred embodiment uses two orientation-coded transponders and one recording assembly that uses a single linear detector array. The two transponders are fixed relative to each other in a fixed coordinate system XYZ and have known positions $P(x_P,y_P,z_P)$ and $Q(x_Q,y_Q,z_Q)$. The recording assembly is attached to a moveable object that has an internal coordinate system PΣT. The position $O(x_O,y_O,z_O)$ and orientation $(\Psi,\Omega,\Phi)$ of the recording assembly relative to the XYZ system is to be determined.

The linear detector array records an image spot $P'(\xi_P,\eta_1,d)$ with the coordinate along one axis $\xi_P$ known, and the parameter d, the vertical distance between the lens and the detector array, known and with the coordinate $\eta_1$ unknown, and it records an image spot $Q'(\xi_Q,\eta_2,d)$ with the values $\xi_Q$ and d known, and the value $\eta_2$ unknown. At the same time, the transponders provide modulation data $N_{UP}$, $N_{VP}$ for the transponder P, and $N_{UQ}$, $N_{VQ}$, for the transponder Q. Thus, there are six measured parameters $\xi_P$, $\xi_Q$, $N_{UP}$, $N_{VP}$, $N_{UQ}$, and $N_{VQ}$. There are six unknown parameters the three position coordinates $(x_O,y_O,z_O)$ and three rotation parameters $(\Psi,\Omega,\Phi)$ of the system PΣT.

The method of calculation of the position and orientation parameters of the object is essentially the same as that of the first embodiment, with only minor differences. The first step is to draw the straight line POP'. This line requires that the center of the sphere lens, the center of the recording assembly lens, and the recorded image spot be collinear. The line equation is $$OP'=t_P \cdot PO \quad (3\text{-}1)$$

where the vector length $t_P$ is a scalar number. Then draw the line QOQ', which has the equation $$OQ'=t_Q \cdot QO \quad (3\text{-}2)$$

where the vector length $t_Q$ is a scalar number.

The first orientation equations are written as $$N_{UP} = N_0 \cdot \sin \theta_1 \cos \phi_1$$

$$N_{VP} = N_0 \cdot \sin \theta_1 \sin \phi_1$$

or $$N_{UP} = [(PO/|PO|) - ((PO/|PO|) \cdot z)z] \cdot x \quad (3\text{-}3)$$

$$N_{VP} = [(PO/|PO|) - ((PO/|PO|) \cdot z)z] \cdot y \quad (3\text{-}4)$$

where x, y, and z are unit axis vectors of the fixed frame system XYZ. The symbol "·" represents a dot product between two vectors.

The second orientation equations are written as $$N_{UQ} = [(QO/|QO|) - ((QO/|QO|) \cdot z)z] \cdot x \quad (3\text{-}5)$$

$$N_{VQ} = [(QO/|QO|) - ((QO/|QO|) \cdot z)z] \cdot y \quad (3\text{-}6)$$

The geometry relationship between the $U_1V_1W_1$ system, $U_2V_2W_2$ system and the XYZ system are known, for example, they are chosen to have all corresponding axes parallel to each other.

There are ten equations and exactly ten unknown values in the equation system. The unknown parameters are the three position parameters $(x_O, y_O, z_O)$, three rotation parameters $(\Psi, \Omega, \Phi)$. Additionally, there are two length values for the vectors PO and QO, $t_P$ and $t_Q$, and two unknown coordinate parameters $\eta_1$ and $\eta_2$. Thus, by solving the equation system (3-1) through (3-6), the ten parameters can be determined.

When using one or more two-dimensional detector arrays instead of the linear arrays, or by using more linear arrays, the same results will be obtained, and data will be available for consistency checks.

The number of measured independent position parameter include one for each transponder, so the total number of independent position parameters is 1+1=2. The number of measured independent orientation modulation parameters for each transponder is 2, so the total number of measured independent orientation independent parameters is 2+2=4. Thus the total number of measured independent parameters is 2+4=6. Note the number of measured independent angle parameters is 4, instead of 3; because there are two orientation-coded transponders located at different positions.

Figure 8:
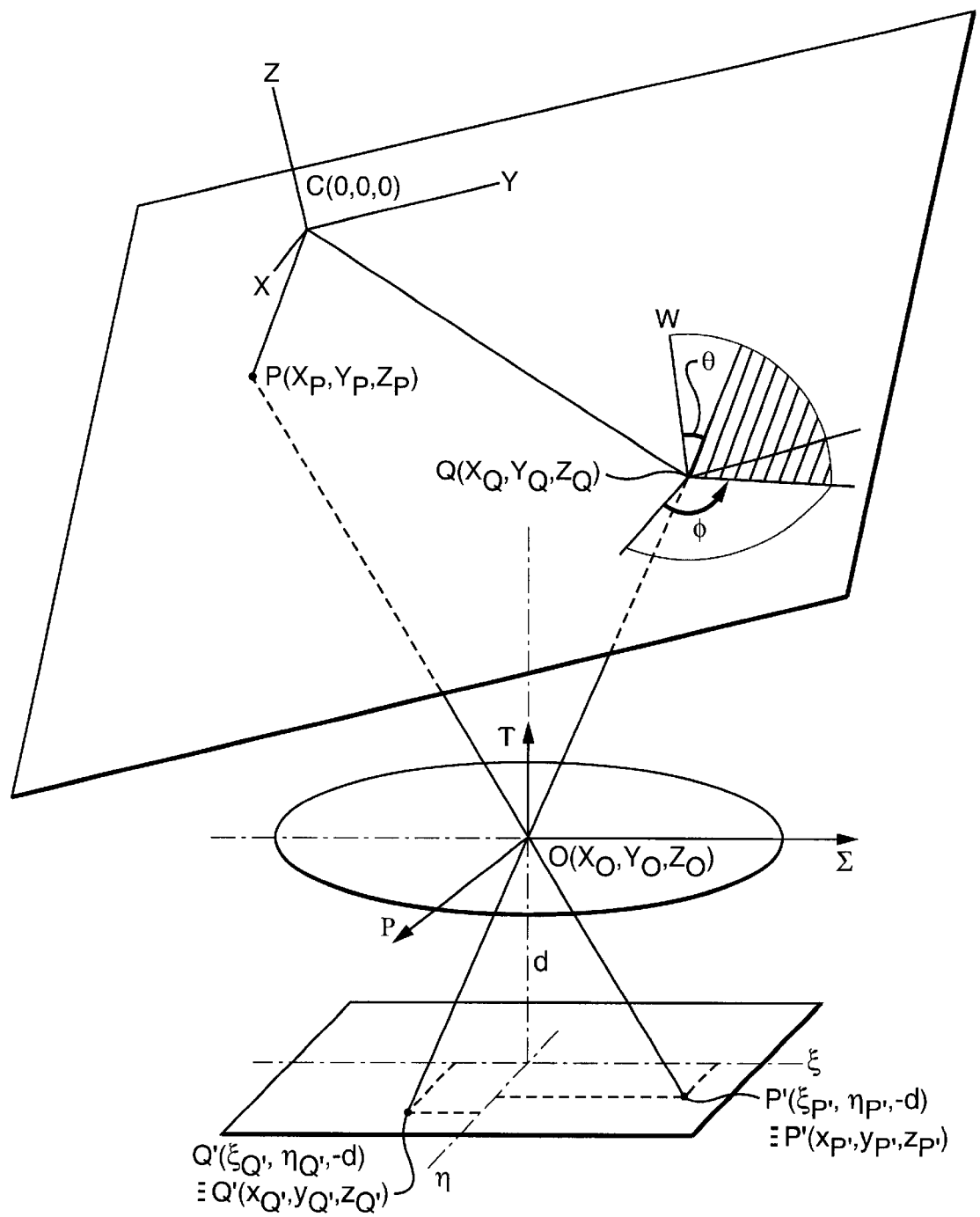
FIG. 8 illustrates the notation for calculation of position and orientation data for the fourth embodiment.

4. The Fourth Preferred Embodiment: At Least One Orientation-Coded Transponder, One ID-Coded Transponder, and One Recording Assembly The fourth preferred embodiment is very close to the configuration of the third preferred embodiment. As shown in FIG. 8, this embodiment uses one ID-coded transponder, one orientation-coded transponder, and one recording assembly that uses a two-dimensional detector. The two transponders are fixed relative to each other in a fixed coordinate system XYZ and have known positions $P(x_P, y_P, z_P)$ and $Q(x_Q, y_Q, z_Q)$. The recording assembly is attached to a moveable object that has an internal coordinate system PΣT with rotation angles $(\Psi, \Omega, \Phi)$ relative to the system XYZ. The position $O(x_O, y_O, z_O)$ and orientation $(\Psi, \Omega, \Phi)$ of the recording assembly relative to the XYZ system is to be determined.

The two-dimensional detector array records two image spots resulting in four position parameters $(\xi_{P'}, \eta_{P'})$ and $(\xi_{Q'}, \eta_{Q'})$. At the same time, the orientation-coded transponder provides modulation data $N_U, N_V$. Thus, there are six measured parameters $\xi_{P'}, \eta_{P'}, \xi_{Q'}, \eta_{Q'}, N_U$, and $N_V$, and there are six unknown parameters, the three position coordinates $(x_O, y_O, z_O)$ and three rotation parameters $(\Psi, \Omega, \Phi)$ of the system PΣT.

The first step to calculating the position and orientation parameters is to draw the straight line POP'. This line requires that the center of the sphere lens, the center of the recording assembly lens, and the recorded image spot be collinear. The line equation is $$OP' = t_P \cdot PO \quad (4\text{-}1)$$

where the vector length $t_P$ is an unknown constant. Then draw the line QOQ', which has the equation $$OQ' = t_Q \cdot QO \quad (4\text{-}2)$$

where the vector length $t_Q$ is an unknown constant.

The orientation equations are written as $$N_U = [(QO/|QO|) - ((QO/|QO|) \cdot z)z] \cdot x \quad (4\text{-}3)$$

$$N_V = [(QO/|QO|) - ((QO/|QO|) \cdot z)z] \cdot y \quad (4\text{-}4)$$

There are eight equations, where the unknown parameters are the three position parameters $(x_O, y_O, z_O)$ and the three rotation parameters $(\Psi, \Omega, \Phi)$. Additionally, there are two length parameters for the vectors PO and QO, $t_P$ and $t_Q$. Thus, by solving the equation system (4-1) through (4-4), the eight parameters can be determined.

The number of measured independent position parameters is 2+2=4, and the number of measured independent orientation modulation parameters is 2+0=2. Thus, the total number of measured independent parameters is: 4+2=6.

Figure 9:
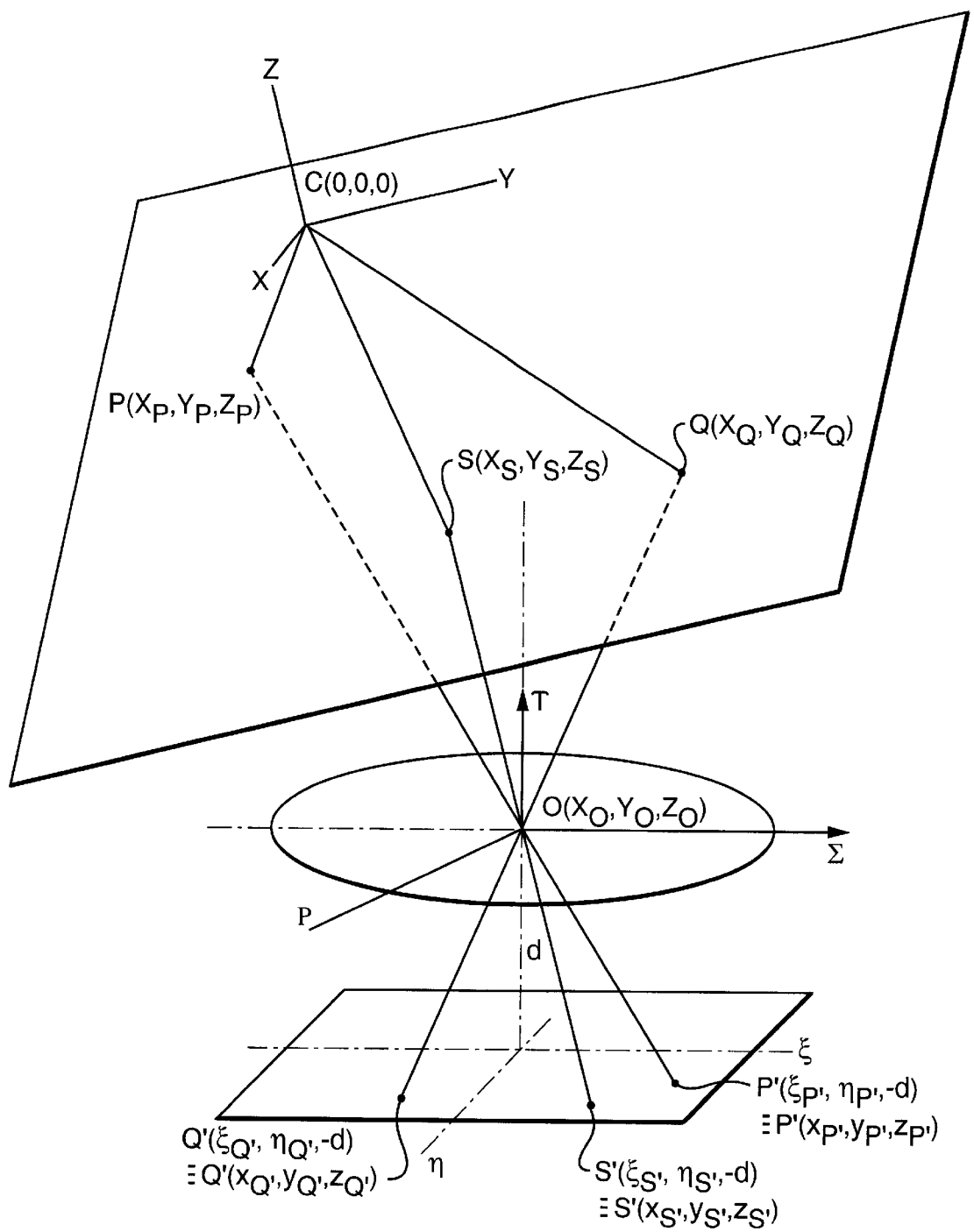
FIG. 9 illustrates the notation for calculation of position and orientation data for the fifth embodiment.

5. The Fifth Preferred Embodiment: At Least Three ID-Coded Transponders and One Recording Assembly As shown in FIG. 9, the fifth preferred embodiment uses three ID-coded transponders and one recording assembly that uses a two-dimensional detector. The three transponders are fixed relative to each other in a fixed coordinate system XYZ and have known positions $P(x_P, y_P, z_P)$, $Q(x_Q, y_Q, z_Q)$, and $S(x_S, y_S, z_S)$ The recording assembly is attached to a moveable object that has an internal coordinate system PΣT with rotation angles $(\Psi, \Omega, \Phi)$ relative to the system XYZ. The position $O(x_O, y_O, z_O)$ and orientation $(\Psi, \Omega, \Phi)$ of the recording assembly relative to the XYZ system is to be determined.

The two-dimensional detector array records three image spots resulting in six position parameters $(\xi_{P'}, \eta_{P'}), (\xi_{Q'}, \eta_{Q'})$, and $(\xi_{S'}, \eta_{S'})$ Thus, there are six measured parameters and six unknown parameters, the three position coordinates $(x_O, y_O, z_O)$ and three rotation parameters $(\Psi, \Omega, \Phi)$ of the system PΣT.

The first step to calculating the position and orientation parameters is to draw the three straight lines POP', QOQ', and SOS'. Line POP' connects the transponder center $P(x_P, y_P, z_P)$ with the recording assembly lens center $O(x_O, y_O, z_O)$ and the corresponding image on the photodetector $P'(x_P, y_P, z_P)$, line QOQ' connects the transponder center $Q(x_Q, y_Q, z_Q)$ with the recording assembly lens center $O(x_O, y_O, z_O)$ and the corresponding image on the photodetector $Q'(x_Q, y_Q, z_Q)$, and line SOS' connects the transponder center $S(x_S, y_S, z_S)$ with the recording assembly lens center $O(x_O, y_O, z_O)$ and the corresponding image on the photodetector $S'(x_S, y_S, z_S)$. The line equations are $$OP' = t_P \cdot PO \quad (5\text{-}1)$$

$$OQ' = t_Q \cdot QO \quad (5\text{-}2)$$

$$OS' = t_S \cdot SO \quad (5\text{-}3)$$

where the vector lengths $t_P, t_Q,$ and $t_S$ are unknown constants.

There are nine equations. The unknown parameters are the three position parameters $(x_O, y_O, z_O)$ and the three rotation parameters $(\Psi, \Omega, \Phi)$. Additionally, there are the three length parameters for the vectors PO, QO, and SO, $t_P$, $t_Q$, and $t_S$. Thus, by solving the equation system (5-1), (5-2), (5-3), the nine parameters can be determined.

The number of measured independent position parameters is 2+2+2=6. No orientation modulation parameters are measured.

In summary, the system of the present invention includes at least one recording assembly rigidly fixed to a first object. Because they are rigidly fixed, the position of each recording assembly relative to the first object is known. Each recording assembly has a light source that emits source light to a second object, which has affixed to it at least one optical transponder. Each transponder is either an identification-coded transponder or an orientation-coded transponder, and because they are rigidly fixed, the position of each transponder relative to the second object is known. The transponders receive the source light, modulates it, and retransmits it back to its source. Identification-coded transponders provide a unique fixed identification modulation code and orientation-coded transponders provide a unique orientation modulation code that represents the direction of the first object relative to the second object. Each of the recording assemblies has a photodetector that records each retransmitted light. If the photodetector has a single linear detector, one independent parameter is recorded. If the photodetector has a single two-dimensional detector or a pair of perpendicular linear detectors, two independent parameters are recorded. Regardless of the type of photodetector, each one records orientation modulation codes as two independent parameters. The unique identification and orientation modulation codes allow the recording assemblies to distinguish the transponders from each other.

B. Data Reduction Procedures

The data reduction procedures cover the computations that solve the equations relating the measured six independent parameters to the six-dimension geometry parameters of the moveable object. The six parameters include the three displacement parameters $T(x_T, y_T, z_T)$ and the three rotation angles $(\alpha, \beta, \gamma)$, as denoted in the first embodiment, or $O(x_O, y_O, z_O)$ and $(\Psi, \Omega, \Phi)$, as denoted in the third embodiment. The final results of the analytical expressions are always presented as a set of simultaneous equations. It is important to note that these equations are always nonlinear. The underlying reason is that in a three-dimensional coordinate system, most elements of the rotation matrix $R(\alpha, \beta, \gamma)$ contain non-reducible nonlinear terms as a function of products of $\cos \alpha$, $\cos \beta$, $\cos \gamma$, $\sin \alpha$, $\sin \beta$, and $\sin \gamma$. After rotation in three dimensions, the equations always contain a product up to third order of such nonlinear terms. For example, if the elements of the rotation matrix $R(\alpha, \beta, \gamma)$ are denoted as $R_{ij}$ with i=1,2,3 and j=1,2,3, then, the general form for the rotation matrix $R(\alpha, \beta, \gamma)$ is: $R_{11}=\cos\beta\cdot\cos\gamma$; $R_{12}=-\cos\beta\cdot\sin\gamma$, $R_{13}=\sin\beta$; $R_{21}=\cos\gamma\cdot\sin\gamma+\sin\alpha\cdot\sin\beta\cdot\cos\gamma$; $R_{22}=\cos\alpha\cdot\cos\gamma-\sin\alpha\cdot\sin\beta\sin\gamma$; $R_{23}=-\sin\alpha\cdot\cos\beta$; $R_{31}=\sin\alpha\cdot\sin\gamma-\cos\alpha\cdot\sin\beta\cos\gamma$; $R_{32}=\sin\alpha\cdot\cos\gamma+\cos\alpha\cdot\sin\beta\cdot\sin\gamma$; $R_{33}=\cos\alpha\cdot\cos\beta$. If the values of $\alpha$, $\beta$, and $\gamma$ are given, the calculations would be along a forward direction and the results could be given in a straight forward way. However, in the present case, the geometry parameters $\alpha$, $\beta$, and $\gamma$ are unknown parameters to be found through solving a set of simultaneous equations. Thus, it always involves a highly challenging task of solving a set of nonlinear equations. The necessity for solving a set of nonlinear equations makes the real-time six-dimensional system substantially different from any position and orientation measurement systems with fewer dimensions.

Generally speaking, according to the current state of mathematics, there is no method that can guarantee a solution to a set of nonlinear equations (see for example, W.H Press, et al., "Numeric Recipes in C", Second Edition, 1992, pp. 347, 379). It is even stated in standard mathematics textbooks that, even in the future, there will not be a good general method for solving nonlinear equations. This situation underscores the fact that the data reduction procedures for solving such equations is a critical issue for the construction of a real-time direct pointing device in six-dimensions.

The present invention contemplates the use of the following four procedures to provide a correct solution to the specific problem as described in the present invention.

(1) Use the best analytical calculations to reduce the number of the nonlinear equations to a minimum. Generally, there can be six or more nonlinear simultaneous equations. In some cases, by using the best analytical calculations, it is possible to reduce the number of equations to three.

(2) Currently, the only computational method for approaching the solution of nonlinear equations is the iteration method. This method first assumes a set of six initial values of geometric parameters for a trial solution, and calculates the results along the forward direction. Then it compares the calculated results and the experimental data actually measured by the system. The method adjusts the six trial values to reduce the deviation. The process is repeated until the deviation is within acceptable limits. While the iteration algorithm ensure that each iteration improves the deviation, none can guarantee that the final result represents the true solution because there are always a number of local minimums that can meet the criteria of the iteration algorithms but not the true solution. There are a number of state-of-the-art iteration algorithms from which one can be chosen. For example, the Newton-Raphson method and the Broyden method are among the best iteration search methods.

Note that methods (1) and (2) are based on skillful use of currently available standard mathematical procedures. In the best case, they can only decrease the difficulty, but still cannot provide a reliable solution. The following methods (3) and (4) are the key techniques of the present invention.

(3) A significant problem with the iteration method is that it may trap to a local minimum which is not a real solution, but that causes the iteration to go in the wrong direction, eventually leading to failure. To avoid the problem, the present invention provides a method, denoted as the "numeric reference grid table method," for guiding the search along a correct path. The basic idea of the numeric reference grid method is to calculate a numeric reference table in advance and then to use the reference table to guide the search. The present invention takes the advantage of the enormously large capacity of today's computers by storing a sufficiently large reference table in fast local memory. The following is an outline of the procedure for calculation of the reference table:

(a) First, for each geometry parameter, divide the entire numeric range within which the parameter varies into a number of discrete grid steps. For example, the displacement $x_T$ is divided into a number of discrete values ranging from $x_T(1)$ to $x_T(n_1)$, where $n_1$ is an integer, for example, $n_1=10$. So, $$x_T = x_T(1), x_T(2), \ldots, x_T(i_1), \ldots, x_T(n_1), \quad \text{(a-1)}$$

$$y_T = y_T(1), y_T(2), \ldots, y_T(i_2), \ldots, y_T(n_2), \quad \text{(a-2)}$$

$$z_T = z_T(1), z_T(2), \ldots, z_T(i_3), \ldots, z_T(n_3), \quad \text{(a-3)}$$

$$\alpha = \alpha(1), \alpha(2), \ldots, \alpha(i_4), \ldots, \alpha(n_4), \quad \text{(a-4)}$$

$$\beta = \beta(1), \beta(2), \ldots, \beta(i_5), \ldots, \beta(n_5), \text{ and} \quad \text{(a-5)}$$

$$\gamma = \gamma(1), \gamma(2), \ldots, \gamma(i_6), \ldots, \gamma(n_6) \quad \text{(a-6)}$$

(b) Calculate a numeric table in the forward direction by first inserting a data set composed of six parameters $(x_T(i_1), y_T(i_2), z_T(i_3), \alpha(i_4), \beta(i_5), \gamma(i_6))$ into the equation system, where parameters $(x_T(i_1))$ take any value from $x_T(1)$ to $x_T(n_1)$. Calculate a similar table for the other geometric parameters. Then, a set of six parameters corresponding to the measured bright spot position in the detector assembly coordinate system are calculated. As illustrated in FIG. 9, for recorded point P' they are:

$$\xi_{P'}[x_T(i_1), y_T(i_2), z_T(i_3), \alpha a(i_4), \beta(i_5), \gamma(i_6)],$$

$$\eta_{P'}[x_T(i_1), y_T(i_2), z_T(i_3), \alpha(i_4), \beta(i_5), \gamma(i_6)],$$

with similar results for recorded point $Q'(\xi_{Q'}, \eta_{Q'})$, and $S'(\xi_{S'}, \eta_{S'})$. A total of six predicted measurement data are calculated. Next, go through all the variable grid values with all possible combinations of $$(x_T(i_1), y_T(i_2), z_T(i_3), \alpha(i_4), \beta(i_5), \gamma(i_6))$$

until all possible combinations are covered.

(c) Invert the forwardly calculated table. As a result, a new table is obtained. The new table is compiled by using the predicted measurement data values as independent arguments. The 6D geometric parameters are dependent functions. The inverted reference grid table takes the form $$x_T = x_T(\xi_{P'}, \eta_{P'}, \xi_{Q'}, \eta_{Q'}, \xi_{S'}, \eta_{S'}), \quad \text{(a-7)}$$

$$y_T = y_T(\xi_{P'}, \eta_{P'}, \xi_{Q'}, \eta_{Q'}, \xi_{S'}, \eta_{S'}), \quad \text{(a-8)}$$

$$z_T = z_T(\xi_{P'}, \eta_{P'}, \xi_{Q'}, \eta_{Q'}, \xi_{S'}, \eta_{S'}), \quad \text{(a-9)}$$

$$\alpha = \alpha(\xi_{P'}, \eta_{P'}, \xi_{Q'}, \eta_{Q'}, \xi_{S'}, \eta_{S'}), \quad \text{(a-10)}$$

$$\beta = \beta(\xi_{P'}, \eta_{P'}, \xi_{Q'}, \eta_{Q'}, \xi_{S'}, \eta_{S'}), \quad \text{(a-11)}$$

$$\gamma = \gamma(\xi_{P'}, \eta_{P'}, \xi_{Q'}, \eta_{Q'}, \xi_{S'}, \eta_{S'}), \quad \text{(a-12)}$$

Superficially, the inverted reference grid table is exactly the desired solution, because from the table data, from the measured each set of six parameters $P'(\xi_{P'}, \eta_{P'})$, $Q'(\xi_{Q'}, \eta_{Q'})$, $S'(\xi_{S'}, \eta_{S'})$, the corresponding 6D geometric parameters $(x_T, y_T, z_T, \alpha, \beta, \gamma)$ can be immediately found by consulting the inverse reference grid table. Actually, this is only partially true, because the data values in the reference table represent only a gross solution. In order to increase the resolution of the solution, the above-described iteration method still must be used. The inverse reference grid table provides a guide for choosing better trial values. As long as the grid is sufficiently fine, the initial value should be sufficiently close to the true solution, and the local minimum trap can be avoided. The inverse reference grid table can also be used in the iteration program as a guiding grid for leading the search for the true solution along the right path.

Note also, that in the process of inversion, due to the use of a finite grid step, the inverted data may have more than one value. A multivalue solution is not acceptable for the final solution. However, a multivalue situation does not present a problem in using the data as a reference, because it can be clarified in the iteration computations.

Under the most unfavorable conditions, there may be six unknown geometric variables. If each variable range is divided into 10 grid values, corresponding to the reference table providing an initial solution with an accuracy of approximately 10%, the total memory space needed for storing a reference table is about $4 \times 10^6 = 4$ Mbytes, assuming that each value needs four bytes of memory. For six reference tables, it will take about $6 \times 4 \times 10^6 = 24$ Mbytes, well within the capacity of most present-day computers. The iteration computation program can further extend the accuracy to better than 1%. On the other hand, under more favorable conditions, there may be only three unknown geometric parameters, for example, only the three rotation angles $(\alpha, \beta, \gamma)$ are unknown. In such a case, each variable can be divided into 100 grid values for the same 4 Mbytes of memory, corresponding to the reference table providing an initial solution with an accuracy of approximately 1%. Then the iteration computation can be further conducted with greater assurance that a local minimum trap will not result.

It is further noted that it is not absolutely necessary that the reference table be inverted. A forwardly calculated table can also be directly stored in the computer memory for reference and used to obtain a group of initial trial values by going through the entire table to find the closest values to the measured values. The disadvantage to this approach is that it takes much more time for the search. On the other hand, no inversion has to be performed. If there are many multivalue results in the inversion process and if a relatively high-speed computer is used, it may be more practical to use the forwardly calculated reference table directly. Both approaches provide approximately the same results.

(4) Use abundance measurements. Because of the nature of the nonlinearity problem, abundance measurements are important. Because each independently measured group of six parameters has an equally good chance of providing a correct solution, when the number of measured parameters is increased to seven, there will be seven groups of measured data, each contains an arbitrary combination of the six of the seven measured parameters. The majority of the solutions must be consistent with each other, and provide the correct solution. In this way the abundance measurements can ensure that the system is highly reliable.

Thus it has been shown and described a wireless position and orientation detecting system which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense,

What is claimed is:

1. A direct input system for determining six dimensions of position and orientation of a movable object relative to a known location, said system comprising:

(a) a first recording assembly fixed relative to said known location and including a first light source and a linear photodetector assembly, said first light source emitting first source light to said movable object;

(b) a second recording assembly fixed relative to said known location and including a second light source and a two-dimensional photodetector assembly, said second light source emitting second source light to said movable object;

(c) an optical transponder fixed to said movable object, said optical transponder receiving, modulating, and retransmitting said first source light as first retransmitted light with a first modulation code representing the direction of said first location relative to said movable object, and said optical transponder receiving, modulating, and retransmitting said second source light as second retransmitted light with a second modulation code representing the direction of said second location relative to said movable object;

(d) said linear photodetector assembly receiving said first retransmitted light, and providing said first modulation code and a one-dimensional coordinate representing one dimension of the direction from which said first retransmitted light is received;

(e) said two-dimensional photodetector assembly receiving said second retransmitted light, and providing said second modulation code and a two-dimensional coordinate pair representing the direction from which said second retransmitted light is received; and (f) a means for calculating said six dimensions of position and orientation of said movable object relative to said known location from said one-dimensional coordinate, said first modulation code, said two-dimensional coordinate pair, and said second modulation code.

2. A direct input system for determining six dimensions of position and orientation of a movable object relative to a known location, said system comprising:

(a) a first optical transponder fixed relative to said known location;

(b) a second optical transponder fixed relative to said known location;

(c) a third optical transponder fixed relative to said known location;

(d) a recording assembly fixed to said movable object and including a light source and a two-dimensional photodetector assembly, said light source emitting source light to said first optical transponder, said second optical transponder, and said third optical transponder;

(e) said first optical transponder receiving, modulating, and retransmitting said source light as first retransmitted light with a first modulation code;

(f) said second optical transponder receiving, modulating, and retransmitting said source light as second retransmitted light with a second modulation code different from said first modulation code;

(g) said third optical transponder receiving, modulating, and retransmitting said source light as third retransmitted light with a third modulation code different from said first modulation code and said second modulation code;

(h) said two-dimensional photodetector assembly receiving said first retransmitted light, and providing said first modulation code and a first two-dimensional coordinate pair representing the direction from which said first retransmitted light is received;

(i) said two-dimensional photodetector assembly receiving said second retransmitted light, and providing said second modulation code and a second two-dimensional coordinate pair representing the direction from which said second retransmitted light is received;

(j) said two-dimensional photodetector assembly receiving said third retransmitted light, and providing said third modulation code and a third two-dimensional coordinate pair representing the direction from which said third retransmitted light is received; and (k) a means for calculating said six dimensions of position and orientation of said movable object relative to said known location from said first two-dimensional coordinate pair, said first modulation code, said second two-dimensional coordinate pair, said second modulation code, said third two-dimensional coordinate pair, and said third modulation code.

3. A direct input system for determining six dimensions of position and orientation of a movable object relative to a known location, said system comprising:

(a) a first recording assembly fixed relative to said known location and including a first light source and a first linear photodetector assembly, said first light source emitting first source light to said movable object;

(b) a second recording-assembly fixed relative to said known location and including a second light source and a second linear photodetector assembly, said second light source emitting second source light to said movable object;

(c) an optical transponder fixed to said movable object, said optical transponder receiving, modulating, and retransmitting said first source light as first retransmitted light with a first modulation code representing the direction of said first location relative to said movable object, and said optical transponder receiving, modulating, and retransmitting said second source light as second retransmitted light with a second modulation code representing the direction of said second location relative to said movable object;

(d) said first linear photodetector assembly receiving said first retransmitted light, and providing said first modulation code and a first one-dimensional coordinate representing one dimension of the direction from which said first retransmitted light is received;

(e) said second linear photodetector assembly receiving said second retransmitted light, and providing said second modulation code and a second one-dimensional coordinate representing one dimension of the direction from which said second retransmitted light is received; and (f) a means for calculating said six dimensions of position and orientation of said movable object relative to said known location from said first one-dimensional coordinate, said first modulation code, said second one-dimensional coordinate, and said second modulation code.

4. A direct input system for determining six dimensions of position and orientation of a movable object relative to a known location, said system comprising:

(a) a first optical transponder fixed relative to said known location;

(b) a second optical transponder fixed relative to said known location;

(c) a recording assembly fixed to said movable object and including a light source and a linear photodetector assembly, said light source emitting source light to said first optical transponder and said second optical transponder;

(d) said first optical transponder receiving, modulating, and retransmitting said source light as first retransmitted light with a first modulation code representing the direction of said movable object relative to said first optical transponder;

(e) said second optical transponder receiving, modulating, and retransmitting said source light as second retransmitted light with a second modulation code representing the direction of said movable object relative to said second optical transponder;

(f) said linear photodetector assembly receiving said first retransmitted light, and providing said first modulation code and a first one-dimensional coordinate representing one dimension of the direction from which said first retransmitted light is received;

(g) said linear photodetector assembly receiving said second retransmitted light, and providing said second modulation code and a second one-dimensional coordinate representing one dimension of the direction from which said second retransmitted light is received; and (h) a means for calculating said six dimensions of position and orientation of said movable object relative to said known location from said first one-dimensional coordinate, said first modulation code, said second one-dimensional coordinate, and said second modulation code.

5. A direct input system for determining six dimensions of position and orientation of a movable object relative to a known location, said system comprising:

(a) a first optical transponder fixed relative to said known location;

(b) a second optical transponder fixed relative to said known location;

(c) a recording assembly fixed to said movable object and including a light source and a two-dimensional photodetector assembly, said light source emitting source light to said first optical transponder and said second optical transponder;

(d) said first optical transponder receiving, modulating, and retransmitting said source light as first retransmitted light with a first modulation code representing the direction of said movable object relative to said first optical transponder;

(e) said second optical transponder receiving, modulating, and retransmitting said source light as second retransmitted light with a second modulation code that is constant regardless of the direction of said movable object relative to said second optical transponder;

(f) said two-dimensional photodetector assembly receiving said first retransmitted light, and providing said first modulation code and a first two-dimensional coordinate pair representing the direction from which said first retransmitted light is received;

(g) said two-dimensional photodetector assembly receiving said second retransmitted light, and providing said second modulation code and a second two-dimensional coordinate pair representing the direction from which said second retransmitted light is received; and (h) a means for calculating said six dimensions of position and orientation of said movable object relative to said known location from said first two-dimensional coordinate pair, said first modulation code, said second two-dimensional coordinate pair, and said second modulation code.

6. A method for determining six dimensions of position and orientation of a first object relative to a second object, said method comprising the steps of:

(a) providing a first coordinate system fixed to said first object;

(b) providing a second coordinate system fixed to said second object;

(c) rigidly fixing at least one recording assembly to said first object, said at least one recording assembly having a light source that emits light as source light to said second object;

(d) providing said at least one recording assembly with a recording assembly reference point with a position and orientation that is known in said first coordinate system;

(e) rigidly fixing at least one optical transponder to said second object, said at least one optical transponder being selected from a group consisting of an identification-coded transponder and an orientation-coded transponder;

(f) providing said at least one optical transponder with a transponder reference point with a position and orientation that is known in said second coordinate system;

(g) said at least one optical transponder receiving, modulating, and retransmitting said source light as modulated light, each of said identification-coded transponders providing a unique fixed identification modulation code, and each of said orientation-coded transponders providing a unique orientation modulation code representing the direction of said first object relative to said second object;

(h) providing said at least one recording assembly with a photodetector selected from the group consisting of a photodetector that records one independent position parameter and a photodetector that records two independent position parameters, each of said photodetectors recording each of said orientation modulation codes as two independent angle parameters;

(i) providing said system with a combination of transponders and photodetectors capable of recording at least six independent parameters; and (j) calculating said six dimensions of position and orientation of said first object relative to said second object from said six independent parameters, said unique modulation codes being used to distinguish said transponders from each other.

7. The method of claim 6 wherein said calculating of said six dimensions of position and orientation is comprised of the steps:

(a) writing an equation set that relates said six independent parameters to said six dimensions of position and orientation;

(b) compiling a reference table through calculation of expected measurement data points as a function of said six dimensions of position and orientation at a number of grid points; and (c) using an iteration algorithm to calculate said six dimensions of position and orientation starting at a set of initial values of said six independent parameters obtained from said reference table.

8. The method of claim 7 wherein said reference table is inverted such that an inverted reference table lists said six dimensions of position and orientation in a numeric table form as a function of said six independent parameters, and said inverted table is used as said reference table.

9. The method of claim 7 wherein said method further comprises the step of using abundance measurements to check the consistency of said six dimensions of position and orientation.

10. A system for determining six dimensions of position and orientation of a first object relative to a second object, said system comprising:

(a) a first coordinate system fixed to said first object;

(b) a second coordinate system fixed to said second object;

(c) at least one recording assembly rigidly fixed to said first object, said at least one recording assembly having a light source that emits source light to said second object, said at least one recording assembly having a recording assembly reference point with a position and orientation that is known in said first coordinate system;

(d) at least one optical transponder rigidly fixed to said second object, said at least one transponder being selected from a group consisting of an identification-coded transponder and an orientation-coded transponder, said at least one transponder having a transponder reference point with a position and orientation that are known in said second coordinate system;

(e) said at least one transponder receiving, modulating, and retransmitting said source light as retransmitted light, each of said identification-coded transponders providing a unique fixed identification modulation code, and each of said orientation-coded transponders providing a unique orientation modulation code representing the direction of said first object relative to said second object;

(f) said at least one recording assembly having a photodetector selected from a group consisting of a photodetector that records one independent position parameter and a photodetector that records two independent position parameters, each of said photodetectors recording said orientation modulation code as two independent angle parameters;

(g) said system including a combination of transponders and photodetectors capable of recording at least six independent parameters, and either said first object has only one recording assembly or said second object has only one optical transponder; and (h) a means for calculating said six dimensions of position and orientation of said first object relative to said second object from said six independent parameters; said unique modulation codes being used to distinguish said at least one transponder from each other.

11. The system of the claim 10 wherein said at least one transponder is a single orientation-coded transponder, and said at least one recording assembly is two recording assemblies, a first of said recording assemblies having a photodetector that records one independent position parameter and said orientation modulation code, a second of said recording assemblies having a photodetector that records two independent position parameters and said orientation modulation code, said six independent parameters being selected from seven independent parameters consisting of said independent position parameter received by said first recording assembly, two angle parameters from said orientation modulation code received by said first recording assembly, said two independent position parameters received by said second recording assembly, and two angle parameters from said orientation modulation code received by said second recording assembly.

12. The system of the claim 10 wherein said at least one transponder is a single orientation-coded transponder, and said at least one recording assembly is two recording assemblies, each of said recording assemblies having a photodetector that records one independent position parameter and said orientation modulation code, said six independent parameters consisting of said independent position parameter received by said first recording assembly, two angle parameters from said orientation modulation code received by said first recording assembly, said independent position parameter received by said second recording assembly, and two angle parameters from said orientation modulation code received by said second recording assembly.

13. The system of the claim 10 wherein said at least one transponder is a first orientation-coded transponder and a second orientation-coded transponder, and said at least one recording assembly is one recording assembly having a photodetector that records one independent position parameter for each of said transponders and said orientation modulation code from each of transponders, said six independent parameters consisting of said independent position parameter of said first transponder, two angle parameters from said orientation modulation code of said first transponder, said independent position parameter from said second transponder, and two angle parameters from said orientation modulation code of said second transponder.

14. The system of the claim 10 wherein said at least one transponder is one orientation-coded transponder and one identification-coded transponder, and said at least one recording assembly is one recording assembly having a photodetector that records two independent position parameters and said orientation-coded transponder from said orientation-coded transponder and two independent position parameters and said identification modulation code from said identification-coded transponder, said six independent parameters consisting of said two independent position parameters of said orientation-coded transponder, two angle parameters from said orientation modulation code of said orientation-coded transponder, and said two independent position parameters from said identification-coded transponder.

15. The system of the claim 10 wherein said at least one transponder is a first identification-coded transponder, a second identification-coded transponder, and a third identification-coded transponder, and said at least one recording assembly is one recording assembly having a photodetector that records two independent position parameters for each of said transponders and said identification modulation code from each of said identification-coded transponders, said six independent parameters consisting of said two independent position parameters of said first transponder, said two independent position parameters from said second transponder, and said two independent position parameters from said third transponder.

* * * * *